(12) United States Patent
Carney Landow et al.

(10) Patent No.: US 11,245,953 B2
(45) Date of Patent: Feb. 8, 2022

(54) PACKETIZED CONTENT STREAM-ENABLED HEADPHONE SYSTEM

(71) Applicant: DISH Network L.L.C., Englewood, CO (US)

(72) Inventors: Kate Megan Carney Landow, Denver, CO (US); Marcel Guajardo, Lakewood, CO (US)

(73) Assignee: DISH Network L.L.C., Englewood, CO (US)

( * ) Notice: Subject to any disclaimer, the term of this patent is extended or adjusted under 35 U.S.C. 154(b) by 76 days.

(21) Appl. No.: 16/598,271

(22) Filed: Oct. 10, 2019

(65) Prior Publication Data

US 2021/0112301 A1    Apr. 15, 2021

(51) Int. Cl.

| | |
|---|---|
| *H04N 21/434* | (2011.01) |
| *H04N 21/2387* | (2011.01) |
| *H04N 21/233* | (2011.01) |
| *H04N 21/426* | (2011.01) |
| *H04N 21/41* | (2011.01) |
| *H04N 21/4363* | (2011.01) |
| *H04R 1/10* | (2006.01) |
| *H04N 21/236* | (2011.01) |

(52) U.S. Cl.
CPC ....... *H04N 21/4343* (2013.01); *H04N 21/233* (2013.01); *H04N 21/2387* (2013.01); *H04N 21/23605* (2013.01); *H04N 21/4126* (2013.01); *H04N 21/4263* (2013.01); *H04N 21/43637* (2013.01); *H04R 1/1041* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 10,341,722 | B2* | 7/2019 | Petruzzelli | H04N 21/42607 |
| 2009/0061841 | A1* | 3/2009 | Chaudhri | H04L 65/1059 |
| | | | | 455/420 |
| 2009/0257607 | A1* | 10/2009 | Abdelgany | H01Q 21/30 |
| | | | | 381/311 |
| 2010/0251292 | A1* | 9/2010 | Srinivasan | H04N 21/440218 |
| | | | | 725/37 |

(Continued)

*Primary Examiner* — An Son P Huynh

(74) *Attorney, Agent, or Firm* — Kilpatrick Townsend & Stockton LLP

(57) ABSTRACT

Novel techniques are described for enabling headphone-driven systems to handle packetized streams of next-generation television (NGTV) content. For example, a headphone system can include an antenna and a NGTV tuner to receive and decode a packetized television content stream wirelessly from a content provider via a digital television content network. The decoded stream can be processed by the headphone system to generate an audio stream and a video stream. Audio content of the audio stream can be output via an audio transducer of the headphone system. The video stream can be transmitted, via a device interface of the headphone system, to a media playback device for outputting of video content (e.g., and audio content, in some cases) of the video stream. For example, the video stream is transmitted, via a short-range wireless network to a smartphone, tablet computer, transport vehicle display, or other playback device.

17 Claims, 5 Drawing Sheets

(56) References Cited

U.S. PATENT DOCUMENTS

| | | | |
|---|---|---|---|
| 2011/0164175 A1* | 7/2011 | Chung | H04N 21/4126 |
| | | | 348/468 |
| 2011/0289525 A1* | 11/2011 | Dureau | H04N 21/431 |
| | | | 725/14 |
| 2013/0145403 A1* | 6/2013 | Sofos | H04N 21/4126 |
| | | | 725/62 |
| 2013/0227619 A1* | 8/2013 | Lewis | H01Q 3/2605 |
| | | | 725/81 |
| 2013/0259256 A1* | 10/2013 | Shen | H04R 3/00 |
| | | | 381/74 |
| 2015/0085735 A1* | 3/2015 | Shelby | H04L 65/4076 |
| | | | 370/312 |
| 2016/0241919 A1* | 8/2016 | Jeon | H04N 21/2541 |
| 2018/0077450 A1* | 3/2018 | Stewart | H04N 21/43637 |
| 2018/0131990 A1* | 5/2018 | Desclos | H01Q 5/25 |
| 2018/0146231 A1* | 5/2018 | Saeedasr | H04N 21/41407 |
| 2018/0184164 A1* | 6/2018 | Petruzzelli | H04N 21/4263 |
| 2018/0359348 A1* | 12/2018 | Katkam | H04M 1/6066 |
| 2019/0392641 A1* | 12/2019 | Taylor | G10L 25/54 |

\* cited by examiner

PACKETIZED CONTENT STREAM-ENABLED HEADPHONE SYSTEM

FIELD

This invention relates generally to media playback systems, and, more particularly, to packetized content stream-enabled headphone-driven systems.

BACKGROUND

In recent years, the television consumption experience has gone through drastic changes. Media consumers have become accustomed to having access to hundreds of channels, advanced program guides, targeted programming, and other features. Further, consumers are increasingly desiring access to those features on increasing numbers and types of consumption platforms, including on smart phones, tablet computers, and other mobile media consumption devices. For example, conventional modern television receiver devices (e.g., televisions, set-top boxes, etc.) are typically configured for various Advanced Television Systems Committee (ATSC) standards and technologies, so as to facilitate receipt, decoding, demodulation, output, and/or other features associated with delivery of digital television. However, access to broadband digital television has remained limited, particularly on mobile devices.

Recent technological developments, including ATSC 3.0, or so-called "next-gen television," are attempting to address those and other limitations. For example, next-gen television standards and technologies enable broadcast of television programming with ultra-high-definition (4K) video, high frame rates and color depths, and other features; all receivable via an antenna and ATSC 3.0 tuner. Still, manufacturers have been slow to add ATSC 3.0 capabilities to smart phones, tablet computers, and other mobile devices (e.g., and also to many fixed devices, such as televisions and set-top boxes). As such, mobile access to broadband digital television has continued to remain limited.

BRIEF SUMMARY

Among other things, embodiments provide novel systems and methods for enabling headphone-driven systems to handle packetized content streams of next-generation television (NGTV) content. For example, a headphone system (e.g., over-the-ear headphones, earbuds, etc.) can include an antenna and a NGTV tuner to receive and decode a packetized television content stream wirelessly from a content provider via a digital television content network. The decoded stream can be processed by the headphone system to generate an audio stream and a video stream. Audio content of the audio stream can be output via an audio transducer of the headphone system. The video stream can be transmitted, via a device interface of the headphone system, to a media playback device for outputting of video content (e.g., and audio content, in some cases) of the video stream. For example, the video stream is transmitted, via a short-range wireless network to a smartphone, tablet computer, transport vehicle display, or other playback device.

According to one set of embodiments, a headphone system is provided. The headphone system includes: an antenna; a content stream processor coupled with the antenna and comprising a next-generation television (NGTV) tuner; and a device interface subsystem configured to communicatively couple with one or more video playback devices. The content stream processor is to: receive a packetized NGTV content stream, via the antenna, from one or more digital television content networks; and process the packetized NGTV content stream, by at least the NGTV tuner, to generate a processed NGTV channel stream comprising audio stream content and video stream content of a NGTV channel of a plurality of NGTV channels being communicated over the digital television content network. The device interface subsystem is to: generate a NGTV output stream from the processed NGTV channel stream, such that the NGTV output stream comprises at least the video stream content; and transmit the NGTV output stream to a video playback device of the one or more video playback devices for output of at least the video stream content via a display of the video playback device.

According to another set of embodiments, a method is provided for handling next-generation television (NGTV) content streams using a headphone system. The method includes: receiving a packetized NGTV content stream, by an antenna of the headphone system, wirelessly from a content provider via a digital television content network; processing the packetized NGTV content stream, by at least a NGTV tuner of the headphone system, to generate a processed NGTV channel stream comprising audio stream content and video stream content of a NGTV channel of a plurality of NGTV channels being communicated over the digital television content network; generating a NGTV output stream from the processed NGTV channel stream, such that the NGTV output stream comprises at least the video stream content; and transmitting the NGTV output stream to a video playback device, via a device interface of the headphone system, for output of at least the video stream content via a display of the video playback device.

According to another set of embodiments, another headphone system is provided. The headphone system includes: a network interface comprising an antenna and a next-generation television (NGTV) tuner, the antenna to wirelessly communicatively couple with one or more digital television content networks; a device interface to communicatively couple with one or more video playback devices; one or more processors; and a memory communicatively coupled with, and readable by, the one or more processors. The memory has stored therein processor-readable instructions which, when executed by the one or more processors, cause the one or more processors to: receive a packetized NGTV content stream, via the antenna of the network interface, from the one or more digital television content networks; process the packetized NGTV content stream, by at least the NGTV tuner of the network interface, to generate a processed NGTV channel stream comprising audio stream content and video stream content of a NGTV channel of a plurality of NGTV channels being communicated over the digital television content network; generate a NGTV output stream from the processed NGTV channel stream, such that the NGTV output stream comprises at least the video stream content; and transmit the NGTV output stream to a video playback device, via the device interface, for output of at least the video stream content via a display of the video playback device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
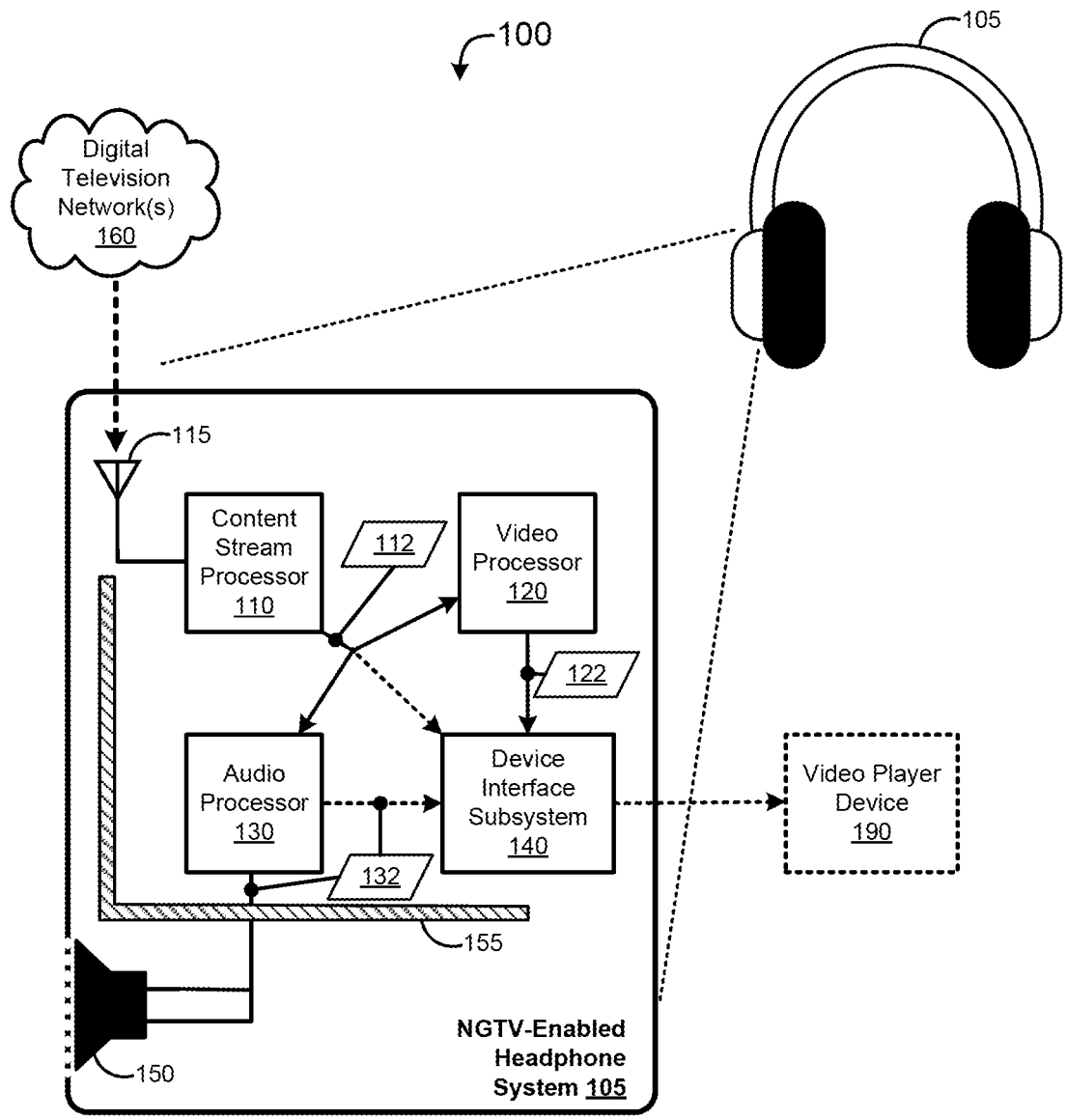
FIG. 1 shows an illustrative media consumption environment that includes an illustrative next-generation television (NGTV) compatible headphone system, according to various embodiments described herein.

FIG. 1 shows an illustrative media consumption environment 100 that includes an illustrative next-generation television (NGTV) compatible headphone system 105, according to various embodiments described herein. Embodiments described herein are assumed to operate in context of packetized content streams, such as ATSC 3.0 and/or other next-generation digital broadcast television streams. Among other things, NGTV seeks to provide free, over-the-air access to broadband television with enhanced features. For example, standards and technologies associated with ATSC 3.0 promise ultra-high-definition resolutions (e.g., 4K video), high frame rates, high color depths, orthogonal frequency-division multiplexed (OFDM) communications, adaptive video encoding, and other features. In some cases, various features are provided through additional channels and return data paths, such as through an Internet connection. For example, such additional channels and return data paths can enable broadcasters to turn on television sets remotely (e.g., to broadcast emergency signals), gather and exploit viewership feedback to improve the targeting of advertisements, and provide various interactive features through the Internet.

The roll-out of NGTV is likely to have an appreciable impact on access by mobile devices (e.g., smart phones, tablet computers, etc.) to broadband digital television. However, these NGTV standards tend not to be backwards-compatible with tuners and other components designed for older standards. For example, access to NGTV involves an antenna to receive the signals and specialized tuners to decode and demodulate the signals. The billions of devices already being used by consumers across the globe, and almost all new devices being manufactured at this time, lack tuners compatible with NGTV; and they are incapable of receiving NGTV broadcasts, or utilizing its associated features, accordingly. Addressing such incompatibility of devices with NGTV can be difficult. For example, it is impractical to retrofit billions of devices with components that are compatible with NGTV, and most device manufacturers have been unwilling to adopt such components even in new models of their devices (particularly in mobile devices).

Embodiments described herein provide novel systems and methods for enabling headphone-driven systems to handle packetized content streams, such as NGTV streams. As illustrated, a NGTV-compatible headphone system 105 is configured to be in communication with one or more digital television networks 160 and one or more video player devices 190. As described herein, the NGTV-compatible headphone system 105 can effectively act as an intermediary to receive and process NGTV signals from the digital television network(s) 160 for output via the video player device(s) 190. To that end, the NGTV-compatible headphone system 105 can include a digital television antenna 115, a content stream processor 110, a video processor 120, an audio processor 130, a device interface subsystem 140, and an audio transducer 150. In some embodiments, the NGTV-compatible headphone system 105 is implemented in over-the-ear headphones. In other embodiments, the NGTV-compatible headphone system 105 is implemented in earbuds.

Embodiments of the content stream processor 110 decode a packetized television content stream received wirelessly from a content provider via the digital television network(s) 160. For example, broadcast television channels broadcast packetized content streams over the digital television network(s) 160 that can be received via the digital television antenna 115 of the NGTV-compatible headphone system 105. The digital television antenna 115 can be implemented using any antenna that is suitable for receipt of the digital broadcast television signals and can fit within the form factor of the NGTV-compatible headphone system 105. For example, in accordance with ATSC 3.0, content streams can be transmitted as orthogonal frequency-division multiplexed (OFDM) signals in accordance with certain packet structures and an Internet protocol-based stack.

The content stream processor 110 can include at least one tuner to tune into a particular broadcast channel stream being received from the digital television network(s) 160 via the digital television antenna 115. In some embodiments, the tuner is coupled with user interface elements and/or other components (e.g., circuits, etc.) to permit selection of which broadcast channel is being received by the content stream processor 110. For example, a user can change channels via user interface elements of the NGTV-compatible headphone system 105 (or an application on a connected device, etc.), thereby directing the tuner to reconfigure (e.g., adjust its resonant frequency) for receipt of a selected channel. In other embodiments, the tuner is fixed to a particular channel. For example, headphones can be provided in a stadium showing an event, and the stadium broadcasts only on a particular channel; so the tuner is hard-coded to that channel.

Embodiments of the content stream processor 110 also include a decoder (e.g., an ATSC 3.0 decoder) and/or any suitable components for filtering, amplifying, demodulating, and/or otherwise processing the received broadcast channel stream for downstream use. Thus, the output of the content stream processor 110 can be a processed NGTV channel stream 112. The processed NGTV channel stream 112 can include audio information, video information, and/or other information (e.g., embedded metadata). The processed NGTV channel stream 112 can be passed to the video processor 120 and to the audio processor 130 for further processing.

Embodiments of the video processor 120 process the processed NGTV channel stream 112 to generate a video data stream 122. In some embodiments, the video processor 120 parses video and related information from the processed NGTV channel stream 112 to generate the video data stream 122. For example, NGTV can support ultra-high-definition video, high dynamic range, wide color gamut, high frame rate, advanced video coding schemes (e.g., high efficiency video coding, "HEVC"), and other video-related features. In some embodiments, the video processor 120 generates the video data stream 122 to include all the video information (and/or other related information) from the processed NGTV channel stream 112. For example, this can enable downstream components (e.g., video player device(s) 190) to use or ignore various types of information, as desired. In other embodiments, the video processor 120 generates the video data stream 122 to include only some video information from the processed NGTV channel stream 112. In one implementation, the NGTV-compatible headphone system 105 can be configured for use with certain types of video player device(s) 190 having certain video-related capabilities (e.g., screen size, resolution, color depth, frame rate, etc.), and the video data stream 122 can be generated only to provide features compatible with those capabilities. In another implementation, the NGTV-compatible headphone system 105 is in communication with one or more video player devices 190 via a channel that supports only a certain bitrate, or has other constraints, and the video data stream 122 is generated to be compatible with the channel. For example, the processed NGTV channel stream 112 includes video encoded using an adaptive video coding scheme that supports multiple bitrates, and the video data stream 122 is generated in accordance with a single one of the supported bitrates. In some embodiments, the video processor 120 generates the video data stream 122 to include only video-related information (e.g., video date, associated metadata, and/or the like) from the processed NGTV channel stream 112. In other embodiments, the video processor 120 generates the video data stream 122 to include both video-related information and some or all audio-related information from the processed NGTV channel stream 112. For example, preserving both the audio and video information in the video data stream 122 can, in some implementations, help maintain audiovisual synchrony in playback and help simplify certain implementation and design aspects.

Embodiments of the audio processor 130 process the processed NGTV channel stream 112 to generate an audio data stream 132. The audio content stream 132 can be passed to the audio transducer 150. The audio transducer 150 can include any suitable components for outputting audio information of the audio data stream 132 as part of a NGTV-compatible headphone system 105. For example, the audio transducer 150 can include a digital to analog converter, filter, amplifier, speaker, etc. Some implementations of the audio transducer 150 include additional components to provide additional features, such as noise cancellation. The audio content stream 132 can include some or all of the audio information from the processed NGTV channel stream 112. For example, NGTV can provide various audio-related features, such as multiple audio streams, more immersive sound, capabilities for multiple languages and enhanced dialogue, advanced audio coding schemes (e.g., Dolby Digital Audio Coding Version 4), etc. Embodiments of the audio transducer 150, and/or other components of the NGTV-compatible headphone system 105 (as described herein) can be configured to exploit and/or facilitate access to some or all of those audio-related features.

Embodiments of the device interface subsystem 140 enable communications between the NGTV-compatible headphone system 105 and video player device(s) 190. In some implementations, the device interface subsystem 140 includes components to facilitate wireless communications with video player device(s) 190, such as one or more antennas, filters, amplifiers, logical ports, components to support wireless communication protocols, etc. In other implementations, the device interface subsystem 140 includes components to facilitate wired communications with video player device(s) 190, such as one or more physical ports, one or more cords (to plug into one or more physical ports of the video player device(s) 190), filters, amplifiers, components to support wired communication protocols, etc.

Embodiments of the device interface subsystem 140 receive at least the video data stream 122 from the video processor 120 for transmission to the video player device(s) 190. In some embodiments, the device interface subsystem 140 further receives the audio data stream 132 from the audio processor 130. In some such embodiments, the audio data stream 132 is transmitted separately from the video data stream 122. For example, separate transmission can facilitate separate audio and video processing by one or more video player device(s) 190 and/or other downstream components. In other such embodiments, the audio data stream 132 is combined (e.g., recombined) with the video data stream 122 prior to transmission by the device interface subsystem 140.

In some embodiments, the processed NGTV channel stream 112 (or particular parsed data from the processed NGTV channel stream 112) can be passed directly from the content stream processor 110 to the device interface subsystem 140 to support various features of NGTV. The processed NGTV channel stream 112 includes various control signals (e.g., separate from audio or video information) that can be processed, or passed to video player device(s) 190, by the device interface subsystem 140. As one example, control signals can be sent by broadcasters over the digital television network(s) 160 to "wake" the NGTV-compatible headphone system 105 (and/or connected video player device(s) 190) from a standby, or off, state, to receive emergency information; and/or certain geo-targeting control information can be transmitted by broadcasters. As another example, control signaling, or the like, can be transmitted by broadcasters using the NGTV streams to support advertising delivery, interactive features, etc.

Some embodiments of the device interface subsystem 140 enable private, secure communications between the NGTV-compatible headphone system 105 and video player device(s) 190. When the device interface subsystem 140 logically pairs with a video player device 190, the pairing can involve setting up of credentials (e.g., exchanging of keys, establishing secure tunnels, etc.), such that communications between the NGTV-compatible headphone system 105 and the video player device 190 are effectively over a private stream. The private stream can be encrypted and/or otherwise secured in any suitable manner. Such private streaming can facilitate user privacy, allow user to close their streams off from (or selectively open their streams up to) others in the vicinity, and/or support various NGTV features (e.g., advanced ATSC 3.0 offerings). In some implementations, the securing of the private stream can be configured to support streaming of rights-controlled media, such as media controlled within a digital rights management regime, a pay-per-view regime, etc. In other implementations, the securing of the private stream permits use of the NGTV-compatible headphone system 105 with business-to-business applications, such as private video conferencing and corporate video distribution.

Some embodiments of the NGTV-compatible headphone system 105 include additional structures to provide additional features. In some embodiments, the content stream processor 110, video processor 120, audio processor 130, device interface subsystem 140, and audio transducer 150 (e.g., and the digital television antenna 115, in some cases) are all housed in a housing. In one implementation, all the components are housed in one "ear" of the NGTV-compatible headphone system 105. In another implementation, the components are distributed between both "ears" of the NGTV-compatible headphone system 105. In some embodiments, the audio transducer 150 is arranged within structure (e.g., of the housing) to permit and/or enhance output of the audio information, such as structure with apertures to direct audio output and/or to regulate air pressure, ballasts, etc. Some embodiments include power-related components, such as a battery, or other charge storage device. Some embodiments further include structural and/or electronic components to reduce electromagnetic radiation and/or interference. For example, as illustrated, a Faraday layer can be configured to mitigate transmission of electromagnetic radiation from the NGTV-compatible headphone system 105 to a human wearer.

Figure 2:
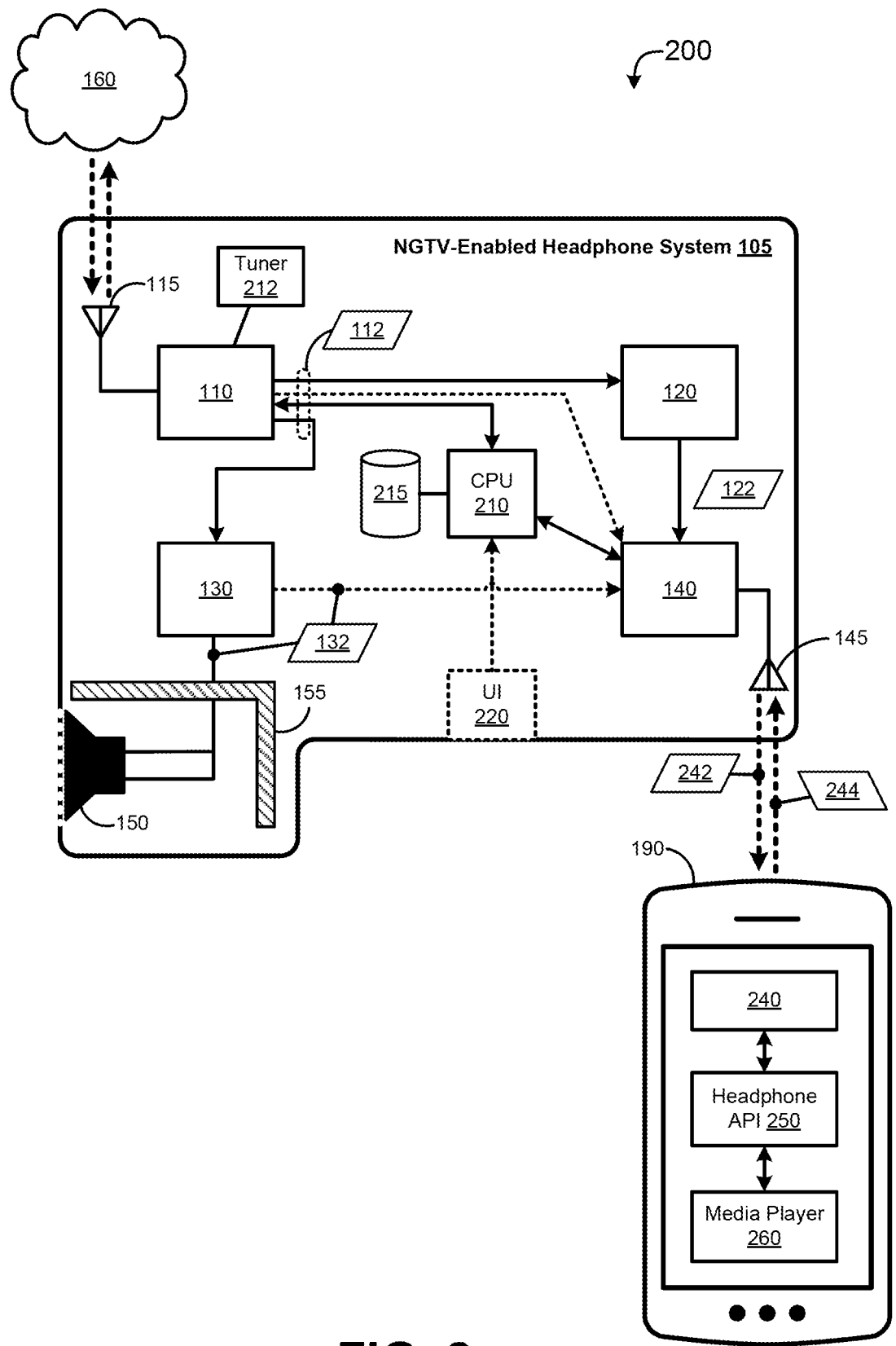
FIG. 2 shows another illustrative media consumption environment having a NGTV-compatible headphone system, according to various embodiments described herein.

FIG. 2 shows another illustrative media consumption environment 200 having a NGTV-compatible headphone system 105, according to various embodiments described herein. The NGTV-compatible headphone system 105 can be an implementation of the NGTV-compatible headphone system 105 of FIG. 1, and similar components are labeled with the same reference designators for the sake of expediency. As illustrated, the NGTV-compatible headphone system 105 is configured to be in communication with one or more digital television networks 160 and a video player device 190. The video player device 190 is illustrated as a smartphone. It is assumed that the video player device 190 does not have capability, on its own, to receive and process NGTV broadcast streams. For example, the video player device 190 does not have an ATSC 3.0-compatible tuner (e.g., and may also not have an digital broadcast television-compatible antenna). As such, as described above, the NGTV-compatible headphone system 105 can effectively act as an intermediary to receive and process NGTV signals from the digital television network 160 for output via the video player device 190.

As described above with reference to FIG. 1, the NGTV-compatible headphone system 105 can include a digital television antenna 115, a content stream processor 110, a video processor 120, an audio processor 130, a device interface subsystem 140, and an audio transducer 150. The content stream processor 110 receives NGTV signals from the digital television network(s) 160 via the digital television antenna 115. The content stream processor 110 decodes the NGTV signals, and outputs a processed NGTV channel stream 112 for downstream use. As illustrated, the content stream processor 110 includes a tuner 212 to selectively receive a particular television channel stream from within the NGTV broadcast signals, such as a particular ATSC 3.0 television channel being broadcast over a particular carrier and/or having particular metadata. The processed NGTV channel stream 112 can be passed to the audio processor 130 for audio processing into an audio data stream 132, which can be output at least to the audio transducer 150. In some embodiments, the processed NGTV channel stream 112 can also be passed to the video processor 120 for video processing into a video data stream 122, which can be output to the device interface subsystem 140. In some embodiments, control signals, and/or other information can also be passed (e.g., as the processed NGTV channel stream 112, or as part of the processed NGTV channel stream 112) from the content stream processor 110 to the device interface subsystem 140. In general, the device interface subsystem 140 outputs NGTV output streams 242, which can include audiovisual data (e.g., at least from the video data stream 122) and/or signaling data.

As illustrated in FIG. 2, embodiments of the NGTV-compatible headphone system 105 can include additional components, such as one or more short-range antennas 145, one or more processors 210 (e.g., a central processing unit, CPU), one or more data stores 215, and/or one or more physical user interface elements 220. Embodiments of the short-range antenna 145 are configured for short-range, broadband wireless communications. In embodiments with the short-range antenna 145, the device interface subsystem 140 can include components to support short-range broadband wireless communications and related protocols, such as over a Bluetooth communication link, a Zigbee communication link, a broadband Internet of Things (IoT) communication link, a wireless fidelity (WiFi) communication link, an optical link, etc. In such embodiment, it is assumed that the video player device 190 also includes at least one short-range antenna 145 and other components to support such short-range broadband wireless communications. In some embodiments, the short-range antenna 145, device interface subsystem 140, and other related components support bi-directional communications.

Embodiments of the video player device 190 can include a mobile communications processor 240, a headphone system application programming interface (API) 250, and a media player application 260. Embodiments of the mobile communications processor 240 include any components to enable signal communications with the device interface subsystem 140. In some embodiments, the mobile communications processor 240 is coupled with a short-range wireless antenna to receive the NGTV output streams 242 (e.g., and communicate device return signals 244 in some embodiments) wirelessly with the NGTV-compatible headphone system 105 (via the device interface subsystem 140). For example, the mobile communications processor 240 can include a Bluetooth chipset coupled with a Bluetooth-compatible antenna.

Embodiments of the headphone system API 250 facilitate interaction between the NGTV-compatible headphone system 105 and the video player device 190. For example, the headphone system API 250 can enable the video player device 190 to recognize the NGTV-compatible headphone system 105 and to access the various features, functions, applications, etc. of the NGTV-compatible headphone system 105. In some embodiments, the headphone system API 250 acts as an intermediary between the mobile communications processor 240 and the media player application 260, so that the media player application 260 is able to effectively output the NGTV output streams 242. For example, the NGTV output stream 242 data is passed to the media player application 260 in such a way that the media player application 260 can playback video data via a display of the video player device 190. In some embodiments, the NGTV output streams 242 include audio data which can be played back by the media player application 260 via speakers of the video player device 190. In some implementations, the NGTV-compatible headphone system 105 does not play audio information directly from the processed NGTV channel stream 112 (e.g., there may not be an audio processor 130, or the audio processor 130 may not generate the audio data stream 132 for playback via the audio transducer 150). Instead, in such implementations, the NGTV output streams 242 include audio data, which is played back by the media player application 260; but the media player application 260 sends the audio data to the NGTV-compatible headphone system 105 via the device return signals 244 for playback via the audio transducer 150. In some embodiments, the media player application 260 includes user interface controls (e.g., accessible via a touchscreen, voice commands, or any other suitable interface control) for controlling playback and/or other features of the media player application 260. For example, the user interface controls can enable user control of playback status (e.g., play, stop, pause, rewind, fast-forward, etc.), volume, brightness or contrast, screen size, playback speed, etc.

Some embodiments of the media player application 260 are configured (e.g., using features of the headphone system API 250) for two-way interaction with the NGTV-compatible headphone system 105. In some such embodiments, the media player application 260 includes additional user interface controls to facilitate such two-way interactions. In one implementation, a user can interact with the user interface controls of the media player application 260 to change the channel being viewed. In response to the user interaction, the media player application 260 (e.g., and/or the headphone system API 250) can generate an appropriate device return signal 244 to cause the tuner 212 to tune the content stream processor 110 for receipt of a different NGTV channel stream. For example, the device return signal 244 is received by the processor(s) 210 via the device interface subsystem 140; and the processor(s) 210 generate signals, in accordance with the device return signal 244, directing the content stream processor 110 to re-tune to the selected channel. In another implementation, the user interface controls of the media player application 260 can be used to change various settings relating to the NGTV-compatible headphone system 105, such as communication bit rates, buffer settings, device compatibility, etc.

Additionally or alternatively, the NGTV-compatible headphone system 105 can have, integrated therein, one or more user interface elements 220. The user interface elements 220 can include any suitable physical user interface elements, such as buttons, switches, microphones, force or pressure sensors, capacitive sensors, optical sensors, etc. In some implementations, at least one of the user interface elements 220 is configured to adjust the NGTV tuner responsive to user interaction with the user interface element 220. For example, the user interface elements 220 include channel up and channel down buttons.

Some embodiments are configured for return data path communications with content sources and/or other entities via the digital television network(s) 160. For example, the ATSC 3.0 standards provide for devices to send data back to programmers and other entities relating to viewership (e.g., which channels are being watched, at what times, for how long, on what devices, etc.). Such information can be used, for example, to help content providers improve their programming (e.g., to offer more desirable programming to consumers), improve targeting of advertisements, etc. In some embodiments, the return data path communications are handled only by the NGTV-compatible headphone system 105. For example, the NGTV-compatible headphone system 105 keeps track of viewership (e.g., by monitoring tuner 212 status, etc.), and periodically reports back to one or more entities via the digital television network(s) 160. In other embodiments, the return data path communications are handled by both the NGTV-compatible headphone system 105 and the video player device 190. For example, the video player device 190 keeps track of viewership (e.g., by monitoring selected channel, etc.), and periodically reports back to the NGTV-compatible headphone system 105, which can pass the information along to one or more entities via the digital television network(s) 160.

Embodiments of the processor(s) 210 can be coupled with, or otherwise in communication with, embodiments of the data store(s) 215. In some embodiments, the processor(s) 210 direct operation of other components, such as the content stream processor 110, video processor 120, audio processor 130, and device interface subsystem 140. In other embodiments, some or all of those components are implemented by (e.g., as part of) the processor(s) 210. For example, the data store(s) 215 can have instructions stored thereon, which, when executed, cause the processor(s) 210 to perform various steps in accordance with the instructions, such as those described herein with reference to the content stream processor 110, video processor 120, audio processor 130, and device interface subsystem 140.

In some embodiments, the data store(s) 215 has user data stored thereon. In some such embodiments, the user of the NGTV-compatible headphone system 105 is a subscriber to one or more broadcast television services, over-the-top media services, and/or other services; and user data relating to those services is stored in the data store(s) 215. In other such embodiments, the user of the NGTV-compatible headphone system 105 is a subscriber to one or more services, the data store(s) 215 can store credentials, identifiers, and/or other user-specific information; and the stored information can be used by a remote service (e.g., a content provider service, a cloud-based service, etc.) to authenticate the user, authorize viewing of particular content, etc. In other such embodiments, the user of the NGTV-compatible headphone system 105 is a subscriber to one or more services, the data store(s) 215 can store various credentials, encryption and/or decryption keys, and/or other user-specific information; and the stored information can be used locally to authorize the user (or the NGTV-compatible headphone system 105) to receive, output, and/or otherwise interface with content received from the digital television network(s) 160 (e.g., paid content, subscription only content, etc.). In some embodiments, the data store(s) 215 have user preferences stored thereon. For example, such preferences can be used by the NGTV-compatible headphone system 105 and/or video player device(s) 190 to suggest content to users, automatically adjust various settings (e.g., to a preferred volume, preferred data rate, preferred playback format, preferred notification preferences, etc.). For embodiments that include return data path capabilities, such preferences can also be sent back to content providers via the digital television network(s) 160, for example to support targeted advertisements.

As described herein, integrating NGTV compatibility into a headphone system can enable otherwise non-compatible devices to become NGTV-compatible video playback devices. For example, a user desires access to ATSC 3.0 television content on a smartphone, laptop computer, tablet computer, or other device that does not have ATSC 3.0 tuners or other compatible components. The video playback device 190 can be used effectively as an NGTV-compatible video playback device by exploiting the NGTV compatibility of the headphone system. In some instances, the user first software configures the video playback device 190 to interact with the NGTV-compatible headphone system 105, for example, by downloading and installing the headphone system API 250 as a stand-alone package, as part of a media player application 260, as part of another application, etc. Even in such cases, the video playback device 190 can be used effectively as an NGTV-compatible video playback device without any NGTV-compatible hardware. By storing preferences, credentials, and/or other information at the NGTV-compatible headphone system 105, additional features can be provided in various contexts. Referring to the preceding example, when the user connects the NGTV capabilities of the NGTV-compatible headphone system 105 with the video playback device 190, the video playback device 190 can automatically be configured in various ways in accordance with the stored user information.

Figure 3:
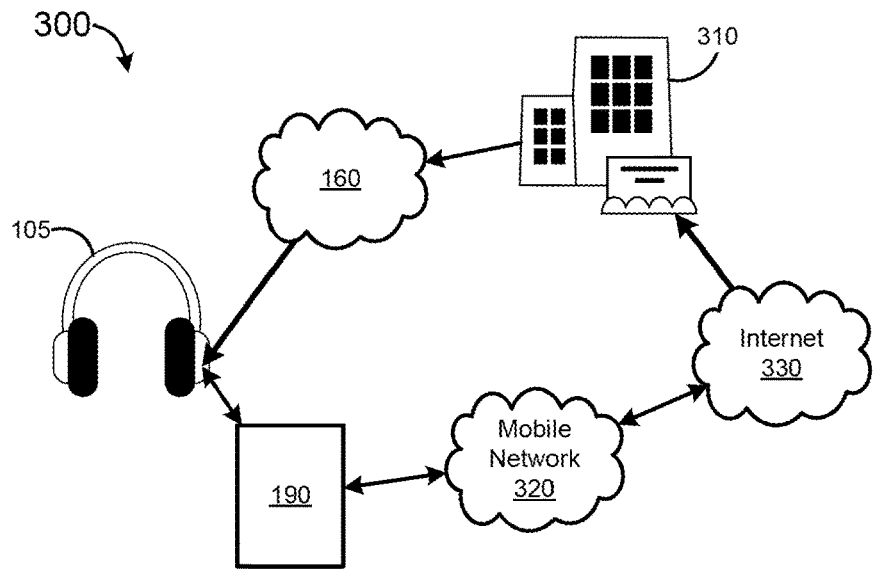
FIG. 3 shows an illustrative communications architecture in which NGTV signals are received by a NGTV-compatible headphone system via a digital television network channel, and return data path communications are provided by a video player device via a mobile network channel.
Figure 4:
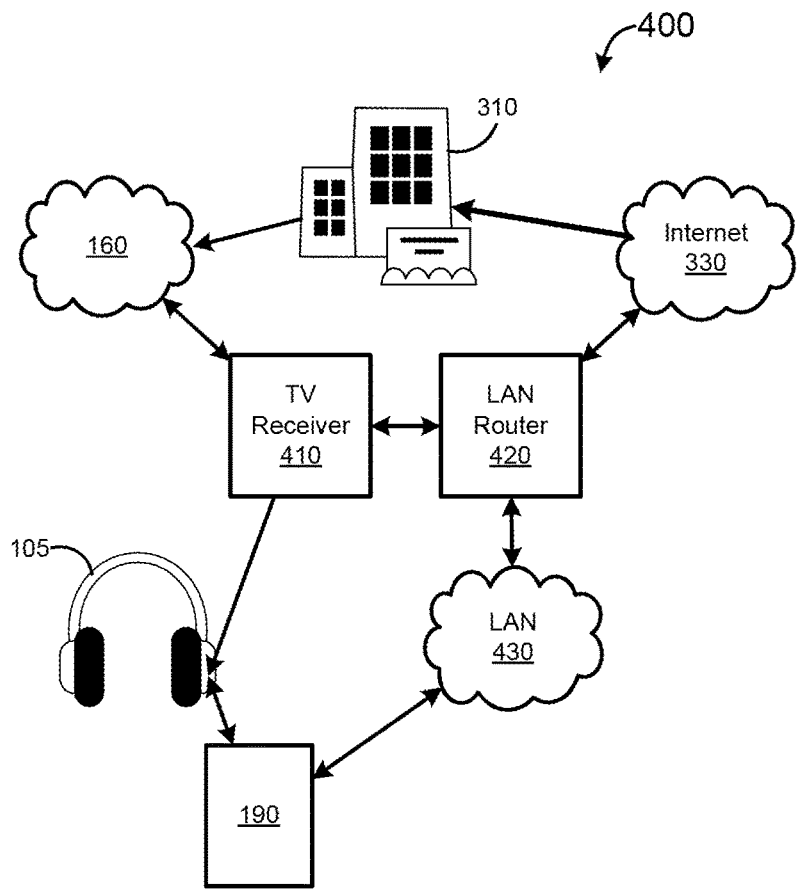
FIG. 4 shows another illustrative communications architecture in which a NGTV-compatible headphone system operates in context of a local area network.

Though FIGS. 1 and 2 show the NGTV-compatible headphone system 105 operating in context only of digital television network(s) 160, other communication architectures can be used. For example, cellular networks, cable networks, satellite networks, local area networks, and/or any other suitable communications network can be used to enable return data path communications. FIGS. 3 and 4 show examples of such alternative communication architectures.

FIG. 3 shows an illustrative communications architecture 300 in which NGTV signals are received by a NGTV-compatible headphone system 105 via a digital television network 160 channel, and return data path communications are provided by a video player device 190 via a mobile network channel. Embodiments of the NGTV-compatible headphone system 105 can operate in the forward data path substantially as described above with reference to FIGS. 1 and 2. For example, the NGTV-compatible headphone system 105 receives NGTV signals from one or more digital broadcast television providers 310 via the digital television network(s) 160, the NGTV-compatible headphone system 105 processes (e.g., decodes, demodulates, filters, amplifies, etc.) the NGTV signals to generate processed NGTV channel streams 112, and the NGTV-compatible headphone system 105 outputs corresponding NGTV output streams 242 to the video player device 190 for playback.

The return data path communications can traverse one or more communications channels separate from the digital television network(s) 160. As illustrated, the video player device 190 is a mobile device configured to connect with one or more mobile networks 320. For example, the mobile network(s) 320 can include a cellular network, cable network, satellite network, local area network, and/or any other suitable public or private communications network. The return data path communications can then be relayed to the digital broadcast television providers 310, from the mobile network(s) 320 via any suitable path. For example, as illustrated, both the mobile network(s) 320 and the digital broadcast television providers 310 can be in communication with the Internet 330, and the return data path communications can be relayed to the digital broadcast television providers 310 via the Internet 330. Alternatively, the digital broadcast television providers 310 are directly in communication with the mobile network(s) 320 and can receive the return data path communications directly from the mobile network(s) 320.

FIG. 4 shows another illustrative communications architecture 400 in which a NGTV-compatible headphone system 105 operates in context of a local area network 430. For example, the local area network 430 can be a private local wireless network in a home, office, transport vehicle, etc. In some embodiments, the NGTV-compatible headphone system 105 can operate in the forward data path substantially as described above with reference to FIGS. 1 and 2. For example, the NGTV-compatible headphone system 105 receives NGTV signals from one or more digital broadcast television providers 310 via the digital television network(s) 160, the NGTV-compatible headphone system 105 processes (e.g., decodes, demodulates, filters, amplifies, etc.) the NGTV signals to generate processed NGTV channel streams 112, and the NGTV-compatible headphone system 105 outputs corresponding NGTV output streams 242 to the video player device 190 for playback. In other embodiments, rather than the NGTV-compatible headphone system 105 receiving NGTV signals directly from the digital television network(s) 160, the digital television network(s) 160 are received via a television receiver 410. It can be assumed that the television receiver 410 is not compatible with NGTV. For example, the television receiver 410 includes, or is coupled with, a digital television antenna, but does not have any NGTV-compatible tuners, decoders, etc. As such, the NGTV signals received by the television receiver 410 can be passed to the NGTV-compatible headphone system 105, which can tune to a channel and process the signal to generate the processed NGTV channel streams 112, and output corresponding NGTV output streams 242 to the video player device 190 for playback.

In other embodiments, rather than the NGTV-compatible headphone system 105 receiving NGTV signals directly from the digital television network(s) 160 or directly from the television receiver 410, the NGTV signals received by the television receiver 410 can be passed through to a local area network (LAN) router 420 that effectively provides the LAN 430; and the NGTV-compatible headphone system 105 can be in communication with the LAN 430 and can receive the NGTV signals via the LAN 430. In such embodiments, the NGTV-compatible headphone system 105 may or may not include the digital television antenna 115. For example, the NGTV-compatible headphone system 105 can include an LAN-capable antenna, which is configured to communicate with the LAN 430. In one implementation, the LAN-capable antenna is included instead of the digital television antenna 115. In another implementation, the LAN-capable antenna is included in addition to the digital television antenna 115. In another implementation, the LAN-capable antenna is included instead of the digital television antenna 115. In another implementation, the LAN-capable antenna is implemented by the short-range antenna 145 (with or without also including the digital television antenna 115).

The video player device 190 is assumed to be compatible with LAN communications (e.g., WiFi). Thus, as illustrated, the return data path communications can be set by the video player device 190 through the LAN 430. In some such embodiments, the LAN 430 can be coupled with the Internet 330 via the LAN router 420 (e.g., the LAN router includes a port for communication with the television receiver 410 and a port for communication with the Internet 330. In other such embodiments, the LAN 430 can be coupled with the Internet 330 via the LAN router 420 and the television receiver 410 (e.g., television receiver 410 includes a port for communication with the digital television network(s) 160 and a port for communication with the Internet 330). Any such communication channels can be used to send the return data path communications from the video player device 190 to the digital broadcast television providers 310.

Figure 5:
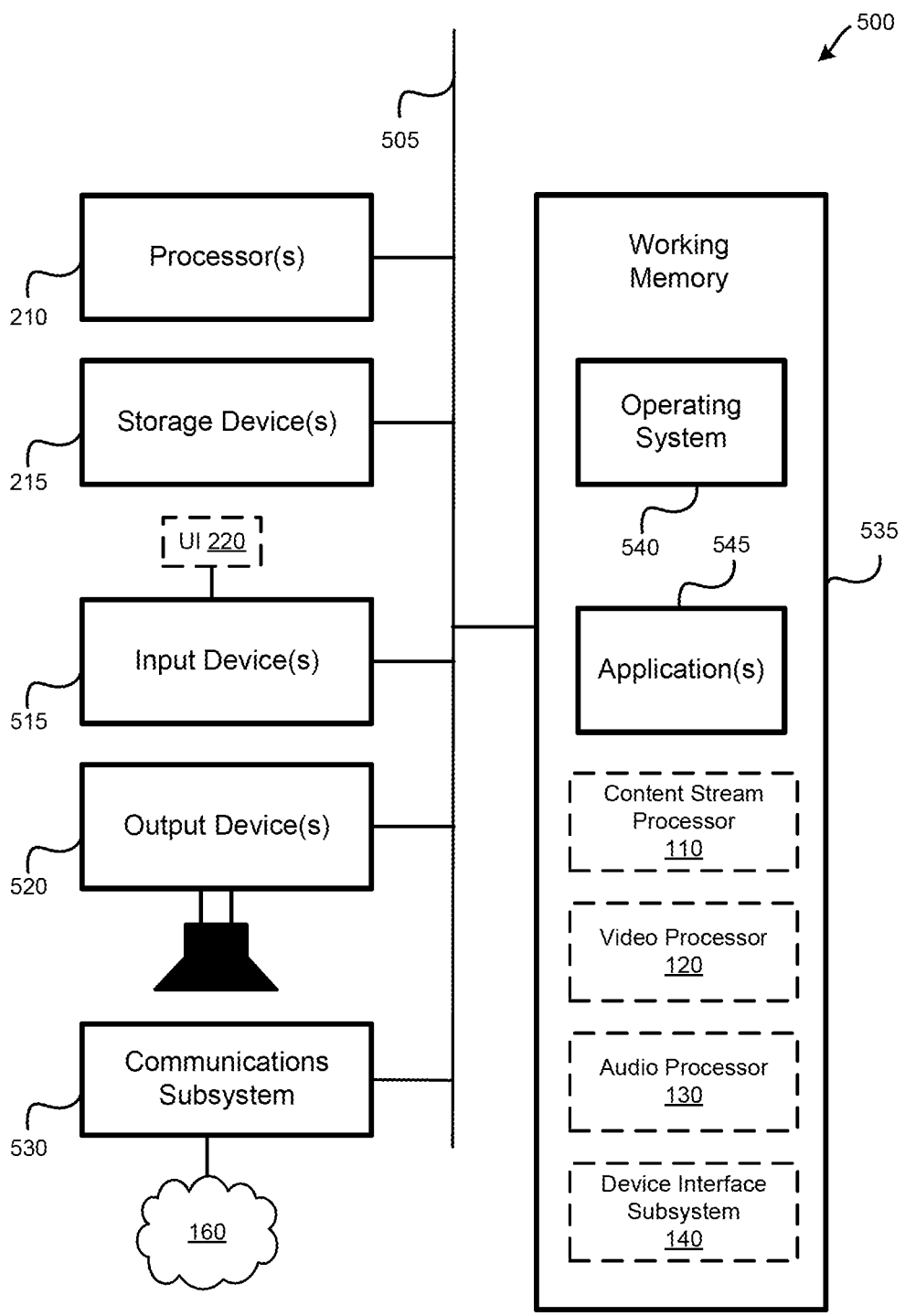
FIG. 5 provides a schematic illustration of one embodiment of a computer system that can implement various features of various embodiments described herein.

A computer system as illustrated in FIG. 5 may be incorporated as part of the previously described computerized devices, such as the NGTV-compatible headphone system 105. FIG. 5 provides a schematic illustration of one embodiment of a computer system 500 that can implement various features of various embodiments described herein. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 210 (e.g., the CPU(s) described with reference to FIG. 2), including, without limitation, one or more general-purpose processors and/or one or more special-purpose processors (such as digital signal processing chips, graphics acceleration processors, video decoders, and/or the like); one or more input devices 515, which can include, without limitation, buttons, switches, microphones, remote control, and/or the like; and one or more output devices 520, which can include, without limitation, a display device, indicator elements, and/or the like. In some embodiments, the output devices 520 can include the audio transducer 150, and the input devices 515 can include the user interface elements 220.

The computer system 500 may further include (and/or be in communication with) one or more non-transitory storage devices 215 (e.g., data store 215 of FIG. 2), which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 500 can also include a communications subsystem 530, which can include, without limitation, an infrared communication device, a wireless communication device, and/or a chipset (such as a Bluetooth™ device, an 502.11 device, a WiFi device, a WiMax device, cellular communication device, etc.), and/or the like. The communications subsystem 530 may permit data to be exchanged with a network (such as the digital television network(s) 160, LAN 330, etc.), personal electronic devices 164, input devices 162, other computer systems, video playback devices 190, and/or any other devices described herein. In some embodiments, components of the communications subsystem 530 implement portions of the content stream processor 110 and/or the device interface subsystem 140.

In many embodiments, the computer system 500 will further comprise a working memory 535, which can include a RAM or ROM device, as described above. The working memory can be, or can be included in, data store(s) 215. The computer system 500 also can comprise software elements, shown as currently being located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods described herein, and/or one or more features described with respect to the systems described herein can be implemented as code and/or instructions executable by a computer (and/or a processor within a computer). In an aspect, then, such code and/or instructions can be used to configure and/or adapt a general purpose computer (or other device) to perform one or more operations in accordance with the described methods or features in accordance with the described systems.

A set of these instructions and/or codes might be stored on a non-transitory computer-readable storage medium, such as the non-transitory storage device(s) 215 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code. In some embodiments, the executable code, when executed, implements one or more of the content stream processor 110, video processor 120, audio processor 130, and/or device interface subsystem 140.

In some embodiments, the computer system 500 implements the NGTV-compatible headphone system 105 in communication with a video playback device 190 (e.g., via components of the communications subsystem 530 interacting with (e.g., directed by) the device interface subsystem 140), and/or in communication with a video playback device 190 (e.g., via components of the communications subsystem 530 interacting with (e.g., directed by) the content stream processor 110). In some embodiments, the NGTV-compatible headphone system 105 includes one or more of the processors 210 and a memory (e.g., working memory 535 implemented by storage devices 215) communicatively coupled with, and readable by, the one or more processors 210 and having stored therein processor-readable instructions. When the instructions are executed by the one or more processors 210, they can cause the one or more processors 210 to perform various steps, such as: receiving a packetized television content stream (e.g., an ATSC 3.0 broadcast television stream) wirelessly from a content provider via a digital television content network 190; processing the packetized content stream to generate an audio stream and a video stream; outputting audio content of the audio stream via an audio transducer 150; transmitting the video stream, via the device interface subsystem 140, to a video playback device 190 for outputting of at least video content of the video stream.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, embodiments may employ a computer system (such as the computer system 500) to perform methods in accordance with various embodiments of the invention. According to a set of embodiments, some or all of the procedures of such methods are performed by the computer system 500 in response to processor 210 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 215. Merely by way of example, execution of the sequences of instructions contained in the working memory 535 might cause the processor(s) 210 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 215. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc., carried by the signals) to the working memory 535, from which the processor(s) 210 retrieves and executes the instructions. The instructions received by the working memory 535 may optionally be stored on a non-transitory storage device 215 either before or after execution by the processor(s) 210.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

Figure 6:
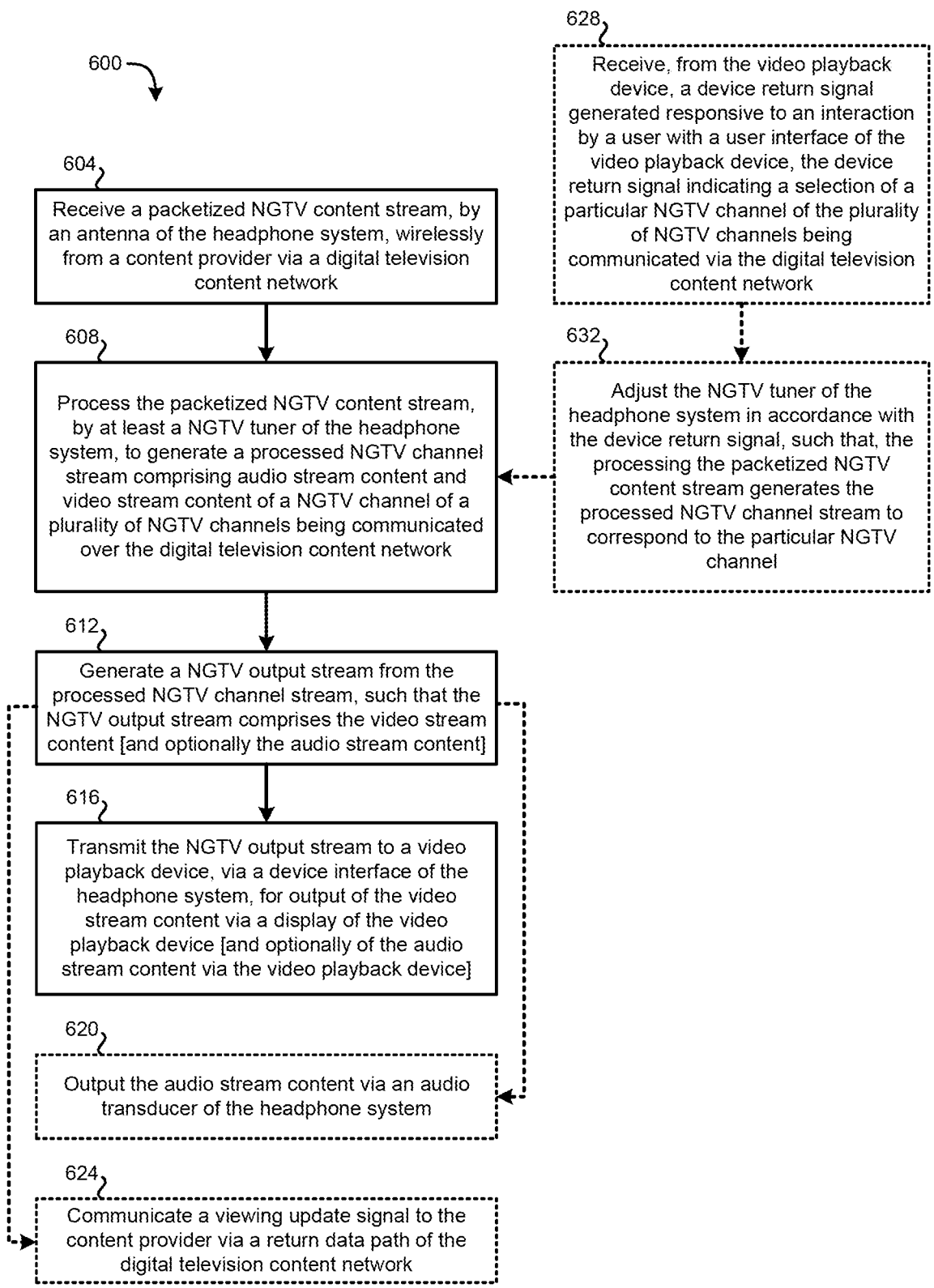
FIG. 6 shows a flow diagram of an illustrative method for handling digital television content streams using a headphone system, according to various embodiments.

Systems, including those described above, can be used to implement various methods. FIG. 6 shows a flow diagram of an illustrative method 600 for handling digital television content streams using a headphone system, according to various embodiments. Embodiments of the method 600 begin at stage 604 by receiving a packetized NGTV content stream, by an antenna of the headphone system, wirelessly from a content provider via a digital television content network. In some embodiments, the antenna is configured to receive the packetized NGTV content stream via a long-range wireless broadcast network of the digital television content network. In other embodiments, the antenna is configured to receive the packetized television content stream via a wireless local area network in communication with a long-range wireless broadcast network of the digital television content network.

At stage 608, embodiments can process the packetized NGTV content stream, by at least a NGTV tuner of the headphone system, to generate a processed NGTV channel stream including audio stream content and video stream content of a NGTV channel of multiple NGTV channels being communicated over the digital television content network. For example, the processing can involve demodulating, filtering, amplifying, etc. At stage 612, embodiments can generate a NGTV output stream from the processed NGTV channel stream, such that the NGTV output stream includes at least the video stream content.

At stage 616, embodiments can transmit the NGTV output stream to a video playback device, via a device interface of the headphone system, for output of at least the video stream content via a display of the video playback device. In some embodiments, the headphone system is coupled with the video playback system via a wired communication link (e.g., via a headphone jack and cable, a universal serial bus (USB) connector and cable, etc.). In other embodiments, the transmitting at stage 616 is over a short-range wireless communications network to the video playback device using an additional antenna of the headphone system (e.g., over Bluetooth, etc.).

In some embodiments, generating the NGTV output stream at stage 612 is such that the NGTV output stream further includes the audio stream content. In some such embodiments, at stage 620, the method 600 can output the audio stream content via an audio transducer of the headphone system. In other such embodiments, the transmitting at stage 616 is further for output of the audio stream content via the video playback device. For example, the video playback device can have its own audio transducer by which to output the audio stream data, and/or the video playback device can be in communication with another device (e.g., the headphone system and/or another device) having an audio transducer by which to output the audio stream data.

In some embodiments, at stage 624, the method 600 can communicate a viewing update signal to the content provider via a return data path of the digital television content network. For example, the processed NGTV channel stream corresponds to a particular NGTV channel of the NGTV channels being communicated via the digital television content network, the particular NGTV channel is selected in accordance with a setting of the NGTV tuner of the headphone system, and the viewing update signal indicates output via the video playback device of the particular NGTV channel. In some implementations, the viewing update signal is communicated to the content provider by the headphone system. In other implementations, the viewing update signal is communicated to the content provider by the video playback device (e.g., via a communication channel that does not include the headphone system, such as a separate Internet connection).

In some embodiments, at stage 628, the method 600 can receive, by the headphone system from the video playback device, a device return signal generated responsive to an interaction by a user with a user interface of the video playback device. The device return signal indicates a selection of a particular NGTV channel of the NGTV channels being communicated via the digital television content network. In such embodiments, at stage 632, the method 600 can adjust the NGTV tuner of the headphone system in accordance with the device return signal, such that, the processing the packetized NGTV content stream generates the processed NGTV channel stream to correspond to the particular NGTV channel. For example, a user can use a user interface of the video playback device to effectively change the NGTV channel being received via the headphone system. Additionally or alternatively, user interface controls of the headphone system itself can be used to change the NGTV channel.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A headphone system comprising:
a housing structure to deliver audio stream content, via an audio transducer disposed within the housing structure, into at least one of a left ear or a right ear of a user wearing the housing structure;
an antenna disposed within the housing structure;
a data store disposed within the housing structure to store user-specific information and video-related capabilities of one or more video playback devices separate from the housing structure;
a content stream processor disposed within the housing structure, coupled with the antenna and the data store, and comprising a next-generation television (NGTV) tuner, the content stream processor to:
  receive a packetized NGTV content stream, via the antenna, from one or more digital television content networks; and
  process the packetized NGTV content stream, by at least the NGTV tuner, to generate a processed NGTV channel stream comprising the audio stream content and video stream content of a NGTV channel of a plurality of NGTV channels being communicated over the one or more digital television content networks and data to preserve audiovisual synchrony in playback between the audio stream content and the video stream content;
an audio processor coupled between the content stream processor and the audio transducer to communicate the audio stream content to the audio transducer for audio output;
a video processor coupled with the content stream processor to parse the processed NGTV channel stream to generate a video data stream to include only a portion of the video stream content, such that the portion of the video stream content is based on the user-specific information and provides features compatible with the video-related capabilities of the one or more video playback devices; and
a device interface subsystem coupled with the video processor to:

generate a NGTV output stream from the video data stream at least by encrypting the video data stream based on the user-specific information, transmit the NGTV output stream to a video playback device of the one or more video playback devices for output of at least the portion of the video stream content via a display of the video playback device in accordance with the data to preserve the audiovisual synchrony between the audio output via the audio transducer and the output of at least the video stream content via the display, and receive, from the video playback device, a device return signal generated responsive to an interaction by a user with a user interface of the video playback device to adjust the NGTV tuner.

2. The headphone system of claim 1, wherein the content stream processor is to process the packetized NGTV content stream in part by directing the audio processor to generate the audio stream content of the processed NGTV channel stream.

3. The headphone system of claim 1, wherein:
the device interface subsystem is to generate the NGTV output stream such that the NGTV output stream further comprises the audio stream content; and
the device interface subsystem is to transmit the NGTV output stream further for output of the audio stream content via the video playback device.

4. The headphone system of claim 1, wherein the antenna is a first antenna configured to receive the packetized NGTV content stream via a long-range wireless broadcast network of the one or more digital television content networks, and further comprising:
a second antenna coupled with the device interface subsystem, the device interface subsystem to transmit the NGTV output stream to the video playback device over a short-range wireless communications network using the second antenna.

5. The headphone system of claim 1, wherein:
the antenna is configured to receive the packetized television content stream via a wireless local area network in communication with a long-range wireless broadcast network of the one or more digital television content networks.

6. The headphone system of claim 1, wherein:
the device return signal indicates a selection of a particular NGTV channel of the plurality of NGTV channels being communicated via the one or more digital television content networks; and
the content stream processor further to adjust the NGTV tuner in accordance with the device return signal, such that, processing the packetized NGTV content stream generates the processed NGTV channel stream to correspond to the particular NGTV channel.

7. The headphone system of claim 1, further comprising:
a physical user interface element in communication with the content stream processor to adjust the NGTV tuner responsive to user interaction with the physical user interface element.

8. The headphone system of claim 1, wherein the packetized NGTV content stream is an Advanced Television Systems Committee (ATSC) 3.0 content stream.

9. A method for handling next-generation television (NGTV) content streams using a headphone system having a housing structure configured to deliver audio stream content into at least one of a left ear or a right ear of a user wearing the housing structure, and having a data store disposed within the housing structure to store user-specific information and video-related capabilities of one or more video playback devices separate from the housing structure, the method comprising:

receiving a packetized NGTV content stream, by an antenna disposed in the housing structure, wirelessly from a content provider via a digital television content network;

processing the packetized NGTV content stream, by at least a NGTV tuner disposed in the housing structure, to generate a processed NGTV channel stream comprising audio stream content and video stream content of a NGTV channel of a plurality of NGTV channels being communicated over the digital television content network and data to preserve audiovisual synchrony in playback between the audio stream content and the video stream content;

communicating, by an audio processor, the audio stream content to an audio transducer disposed within the housing structure for audio output;

generating, by a video processor, a video data stream by parsing the processed NGTV channel stream to include only a portion of the video stream content based on the user-specific information and based on providing features compatible with the video-related capabilities of the one or more video playback devices;

generating, by a device interface subsystem coupled with the video processor, a NGTV output stream from the video data stream at least by encrypting the video data stream based on the user-specific information;

transmitting, by the device interface subsystem, the NGTV output stream to a video playback device of the one or more video playback devices for output of at least the portion of the video stream content via a display of the video playback device in accordance with the data to preserve the audiovisual synchrony between the audio output via the audio transducer and the output of at least the video stream content via the display; and receiving, by the device interface subsystem and from the video playback device, a device return signal generated responsive to an interaction by a user with a user interface of the video playback device to adjust the NGTV tuner.

10. The method of claim 9, wherein:
the generating the NGTV output stream is such that the NGTV output stream further comprises the audio stream content; and
the transmitting the NGTV output stream is further for output of the audio stream content via the video playback device.

11. The method of claim 9, wherein:
the antenna of the headphone system is a first antenna configured to receive the packetized NGTV content stream via a long-range wireless broadcast network of the digital television content network; and
the transmitting is over a short-range wireless communications network to the video playback device using a second antenna of the headphone system.

12. The method of claim 9, wherein:
the antenna of the headphone system is configured to receive the packetized television content stream via a wireless local area network in communication with a long-range wireless broadcast network of the digital television content network.

13. The method of claim 9, further comprising:
communicating a viewing update signal to the content provider via a return data path of the digital television content network,
wherein the processed NGTV channel stream corresponds to a particular NGTV channel of the plurality of NGTV channels being communicated via the digital television content network, the particular NGTV channel selected in accordance with a setting of the NGTV tuner of the headphone system, and
the viewing update signal indicates output via the video playback device of the particular NGTV channel.

14. The method of claim 9, further comprising:
adjusting the NGTV tuner of the headphone system in accordance with a device return signal that indicates a selection of a particular NGTV channel of the plurality of NGTV channels being communicated via the digital television content network, such that, the processing the packetized NGTV content stream generates the processed NGTV channel stream to correspond to the particular NGTV channel.

15. A headphone system comprising:
a housing structure configured to deliver audio stream content into at least one of a left ear or a right ear of a user wearing the housing structure;
a network interface disposed within housing structure and comprising an antenna and a next-generation television (NGTV) tuner, the antenna to wirelessly communicatively couple with one or more digital television content networks;
a device interface, disposed within the housing structure, to communicatively couple with one or more video playback devices remote from the housing structure;
one or more processors disposed within the housing structure; and
a memory disposed within the housing structure, communicatively coupled with, and readable by, the one or more processors and having stored therein user-specific information, video-related capabilities of one or more video playback devices separate from the housing structure, and processor-readable instructions which, when executed by the one or more processors, cause the one or more processors to:
receive a packetized NGTV content stream, via the antenna of the network interface, from the one or more digital television content networks;
process the packetized NGTV content stream, by at least the NGTV tuner of the network interface, to generate a processed NGTV channel stream comprising the audio stream content and video stream content of a NGTV channel of a plurality of NGTV channels being communicated over the one or more digital television content networks and data to preserve audiovisual synchrony in playback between the audio stream content and the video stream content;
communicate, via an audio processor disposed in the housing structure, the audio stream content to the audio transducer for audio output via the housing structure;
generate, by a video processor disposed in the housing structure, a video data stream by parsing the processed NGTV channel stream to include only a portion of the video stream content based on the user-specific information and based on providing features compatible with the video-related capabilities of the one or more video playback devices;
generate, by the device interface, a NGTV output stream from the video data stream at least by encrypting the video data stream based on the user-specific information;
transmit, by the device interface, the NGTV output stream to a video playback device of the one or more video playback devices, via the device interface, for output of at least the video stream content via a display of the video playback device in accordance with the data to preserve the audiovisual synchrony between the audio output via audio transducer and the output of at least the video stream content via the display; and
receive, by the device interface and from the video playback device, a device return signal generated responsive to an interaction by a user with a user interface of the video playback device to adjust the NGTV tuner.

16. The headphone system of claim 15, wherein:
the antenna of the headphone system is a first antenna configured to receive the packetized NGTV content stream via a long-range wireless broadcast network of the one or more digital television content networks; and
the transmitting is over a short-range wireless communications network to the video playback device using a second antenna of the headphone system.

17. The headphone system of claim 15, wherein the instructions, when executed by the one or more processors, cause the one or more processors further to:
adjust the NGTV tuner in accordance with a device return signal that indicates a selection of a particular NGTV channel of the plurality of NGTV channels being communicated via the one or more digital television content networks, such that, the processing the packetized NGTV content stream generates the processed NGTV channel stream to correspond to the particular NGTV channel.

* * * * *